United States Patent
Xu et al.

(10) Patent No.: US 8,238,747 B2
(45) Date of Patent: Aug. 7, 2012

(54) METHOD AND APPARATUS FOR GENERATING DQPSK ENCODING OPTICAL SIGNAL

(75) Inventors: Xiaogeng Xu, Shenzhen (CN); Chao Lv, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 337 days.

(21) Appl. No.: 12/628,517

(22) Filed: Dec. 1, 2009

(65) Prior Publication Data
US 2010/0080569 A1   Apr. 1, 2010

Related U.S. Application Data

(63) Continuation of application No. PCT/CN2009/070036, filed on Jan. 5, 2009.

(30) Foreign Application Priority Data

Feb. 4, 2008 (CN) .......................... 2008 1 0009197

(51) Int. Cl.
*H04J 14/06* (2006.01)
*H04B 10/04* (2006.01)
*H04B 10/12* (2006.01)
(52) U.S. Cl. ......................................... 398/65; 398/188
(58) Field of Classification Search .................... 398/65, 398/152, 184, 188
See application file for complete search history.

(56) References Cited

U.S. PATENT DOCUMENTS

| | | | |
|---|---|---|---|
| 7,672,589 B2 * | 3/2010 | Gottwald et al. | 398/65 |
| 7,865,080 B2 * | 1/2011 | Hecker et al. | 398/65 |
| 2003/0206676 A1 | 11/2003 | Ovadia et al. | |
| 2004/0184819 A1 * | 9/2004 | Vassilieva et al. | 398/188 |
| 2007/0230625 A1 | 10/2007 | Hironishi et al. | |
| 2010/0098435 A1 | 4/2010 | Akiyama | |

FOREIGN PATENT DOCUMENTS

| | | |
|---|---|---|
| CN | 1682472 A | 10/2005 |
| CN | 1918837 A | 2/2007 |
| CN | 101032101 A | 9/2007 |

(Continued)

OTHER PUBLICATIONS

International Search Report from P.R. China in International Application No. PCT/CN2009/070036 mailed Apr. 16, 2009.
First Chinese Office Action dated (mailed) Feb. 1, 2011, issued in related Chinese Application No. 200810009197.X, Huawei Technologies Co., Ltd.

(Continued)

*Primary Examiner* — Shi K Li
(74) *Attorney, Agent, or Firm* — Finnegan, Henderson, Farabow, Garrett & Dunner LLP

(57) ABSTRACT

A method and an apparatus for generating a differential quadrature phase shift keying (DQPSK) code optical signal are provided. The method may includes splitting an optical signal to obtain two polarized optical signals, modulating and phase-shifting one of the two polarized optical signals to obtain a phase-shifted and polarized optical signal, and modulating the other of the two polarized optical signals to obtain another polarized and modulated optical signal. The phase-shifted and polarized optical signal may be combined with the other polarized and modulated optical signal to obtain a polarization multiplexed optical signal. The method may further include, polarizing the polarization multiplexed optical signal to obtain the DQPSK code optical signal. The apparatus may include a polarization beam splitter (PBS), modulators, a phase-shift controller, a polarization beam combiner (PBC), and a polarizer. Through the processes of beam splitting, modulation, phase-shifting, beam combination, and polarization, the DQPSK code optical signal can be generated stably.

6 Claims, 4 Drawing Sheets

FOREIGN PATENT DOCUMENTS

| | | | |
|---|---|---|---|
| CN | 101047448 A | | 10/2007 |
| EP | 0781001 A1 | | 6/1997 |
| EP | 1764935 A2 | | 3/2007 |
| EP | 1791274 B1 | | 5/2007 |
| WO | WO03049331 A1 | | 6/2003 |
| WO | WO-03/096584 | * | 11/2003 |
| WO | WO2004028046 A1 | | 4/2004 |
| WO | WO2005076509 A1 | | 8/2005 |
| WO | WO-2006/079634 | * | 8/2006 |
| WO | WO2007044521 A1 | | 4/2007 |

OTHER PUBLICATIONS

Extended European Search Report dated (mailed) Mar. 1, 2011, issued in related Application No. 09708391.9—2415/2154799 PCT/CN2009070036, Hauwei Technologies Co., Ltd.

Written Opinion of the International Searching Authority (translation) dated (mailed), Apr. 16, 2009 issued in related Application No. PCT/CN2009/070036, filed Jan. 5, 2009, Huawei Technologies Co., Ltd.

* cited by examiner

METHOD AND APPARATUS FOR GENERATING DQPSK ENCODING OPTICAL SIGNAL

CROSS-REFERENCE TO RELATED APPLICATIONS

This application is a continuation of International Application No. PCT/CN2009/070036, filed on Jan. 5, 2009, which claims priority to Chinese Patent Application No. 200810009197.X, filed on Feb. 4, 2008, both of which are hereby incorporated by reference in their entireties.

FIELD OF THE TECHNOLOGY

The present disclosure relates to the field of communications, and more particularly to a method and an apparatus for generating a differential quadrature phase shift keying (DQPSK) code optical signal.

BACKGROUND

With the increase of video services in networks, the capacity of the entire network is required to be higher. At present, a rate upgrade may be needed for an optical network, and a next generation optical network has a rate of 40 Gb/s or higher. For example, a rate of an Ethernet is upgraded by 10 times. The 100 GE is being discussed currently, and the 100 Gb/s optical transmission technology has become a hot topic nowadays.

For a 40 Gb/s optical transmission system, multiple optical modulation code patterns exist, for example, a non-return-to-zero (NRZ) code, a return-to-zero (RZ) code, a carrier suppressed return-to-zero (CSRZ) code, an optical duobinary (ODB) code, and a DQPSK code. For a 100 Gb/s optical transmission system, optical modulation code patterns such as DQPSK, vestigial side band (VSB), NRZ, and ODB exist. Among them, the DQPSK has become a mainstream modulation code pattern of 40 Gb/s and 100 Gb/s. With the DQPSK modulation code pattern, a baud rate of the system can be reduced, thereby lowering the requirements for underlying optical network facilities.

In the prior art, two main solutions for generating a DQPSK optical signal exist, which are described as follows.

One solution is a parallel solution, which is currently the most commonly used solution. A schematic structural view of the parallel solution is shown in FIG. 1. An optical signal output from a laser is split into two optical signals having the same light intensity through a Y-branch beam splitter. One optical signal is modulated and then phase-shifted to obtain a phase-shifted optical signal. The other optical signal is modulated. The phase-shifted optical signal and the modulated optical signal are combined through the Y-branch beam splitter to obtain a DQPSK optical signal.

The solution has the following disadvantages. First, the Y-branch beam splitter has a significant influence on the entire apparatus. The realization for the Y-branch beam splitter to split one optical signal into two optical signals having the same light intensity may be complex and expensive. Second, it is difficult for the solution to control a light intensity percentage ratio of an X-polarized component to a Y-polarized component of the two beams of light, which causes unstable light intensity so as to deteriorate the transmission performance. Moreover, the change of external factors (for example, temperature and shock) may result in the change of the percentage ratio of the polarized components.

The other solution is a serial solution. The solution employs a Mach-Zender modulator (MZM) to obtain a binary phase shift keying (BPSK) optical signal. The BPSK optical signal passes through a phase modulator to obtain a DQPSK optical signal.

The solution has the disadvantage that the phase modulator requires a much high high-frequency response. For example, in a 40 G GB/s DQPSK system, the phase modulator is required to ensure a phase modulation of 90 degrees at a baud rate of 20 G and in a 100 G GB/s DQPSK system, the phase modulator is also required to ensure a phase modulation of 90 degrees at a baud rate of 50 G, which are difficult to realize.

SUMMARY

In order to improve the system performance, the present disclosure is directed to a method and an apparatus for generating a DQPSK code optical signal. The technical solution is described as follows.

The present disclosure provides a method for generating a DQPSK code optical signal. The method may include the following steps.

A received optical signal is split to obtain two polarized optical signals.

One of the two polarized optical signals is modulated to obtain a polarized and modulated optical signal, and the polarized and modulated optical signal is phase-shifted to obtain a phase-shifted and polarized optical signal.

The other of the two polarized optical signals is modulated to obtain another polarized and modulated optical signal.

The phase-shifted and polarized optical signal and the other polarized and modulated optical signal are combined to obtain a polarization multiplexed optical signal.

The polarization multiplexed optical signal is polarized to obtain the DQPSK code optical signal.

The present disclosure provides an apparatus for generating a DQPSK code optical signal. The apparatus may include a polarization beam splitter (PBS), a first modulator, a phase-shift controller, a second modulator, a polarization beam combiner (PBC), and a polarizer.

The PBS may be configured to split an optical signal to obtain two polarized optical signals.

The first modulator may be configured to modulate one of the two polarized optical signals to obtain a polarized and modulated optical signal.

The phase-shift controller may be configured to phase-shift the polarized and modulated optical signal to obtain a phase-shifted and polarized optical signal.

The second modulator may be configured to modulate the other of the two polarized optical signals to obtain another polarized and modulated optical signal.

The PBC may be configured to combine the phase-shifted and polarized optical signal and the other polarized and modulated optical signal to obtain a polarization multiplexed optical signal.

The polarizer may be configured to polarize the polarization multiplexed optical signal according to a direction angle to obtain the DQPSK code optical signal.

Through the processes of beam splitting, modulation, phase-shifting, beam combination, and polarization, the technical solution described in the disclosure may reduce the occurrence of the problem of inconsistent light intensity ratio of an X-polarized component to a Y-polarized component in the prior art, avoid the jitter of an output light intensity due to the change of a polarization state, lower the requirements for the external operating environment, and generate a DQPSK optical signal more stably, thereby helping to improve the system performance.

DETAILED DESCRIPTION

First Embodiment

Figure 1:
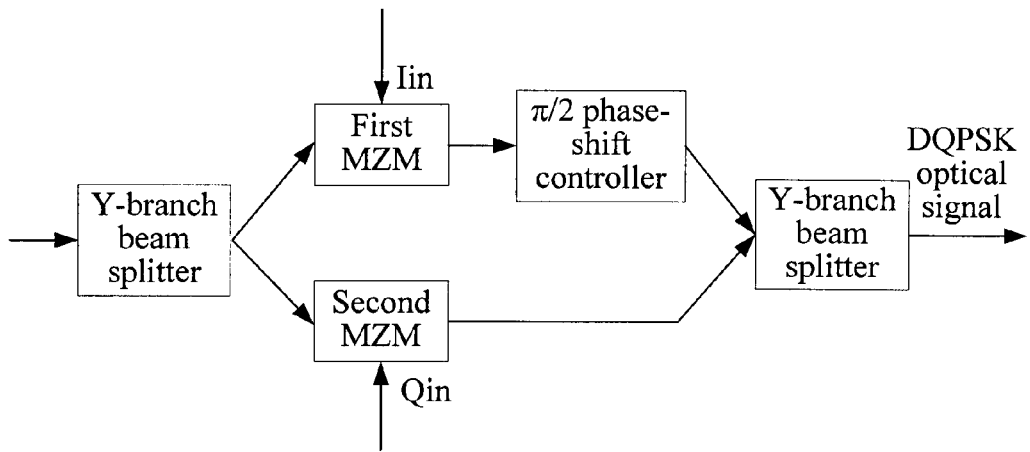
FIG. 1 is a schematic view of a parallel solution for generating a DQPSK optical signal in the prior art.
Figure 2:
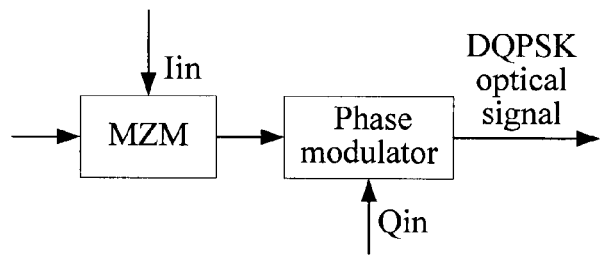
FIG. 2 is a schematic view of a serial solution for generating a DQPSK optical signal in the prior art.
Figure 3:
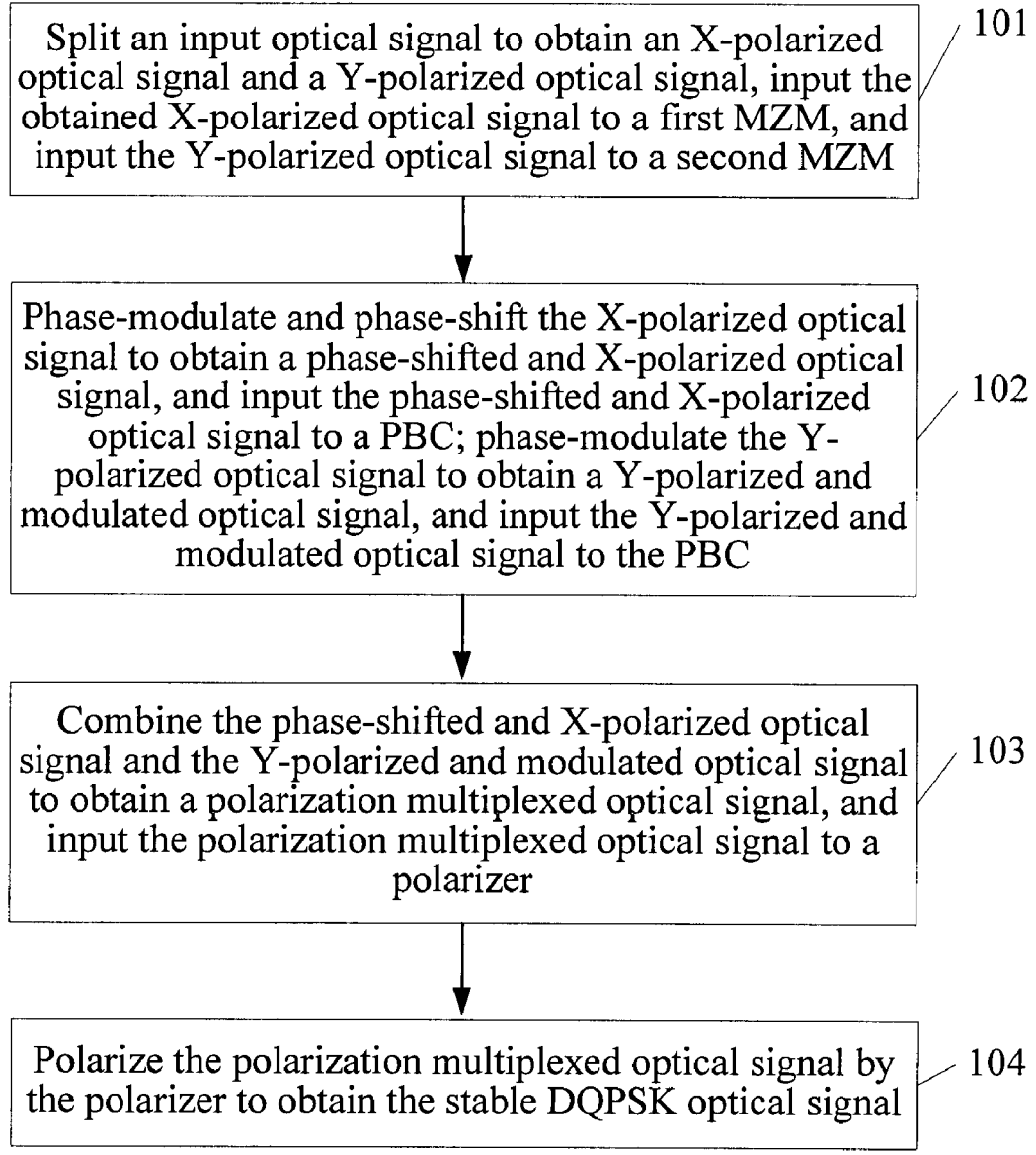
FIG. 3 is a flow chart of a method for generating a DQPSK optical signal consistent with a first embodiment.

In order to improve the system performance, the embodiments consistent with the disclosure provide a method for generating a DQPSK optical signal. Through processes of beam splitting, modulation, phase-shifting, beam combination, and polarization, the method can generate the DQPSK optical signal stably, thereby helping to improve the system performance. Referring to FIG. 3, some embodiments may include the steps as follows.

In step 101, an input optical signal is split by a PBS to obtain an X-polarized optical signal and a Y-polarized optical signal, the obtained X-polarized optical signal is input to a first MZM, and the Y-polarized optical signal is input to a second MZM.

It should be noted that, the PBS can split the optical signal into the X-polarized optical signal and the Y-polarized optical signal directly by using the birefringence effect of optical crystals. A light intensity ratio of the X-polarized optical signal to the Y-polarized optical signal may be 1:1 or other light intensity ratios. Since polarization states of the two optical signals are orthogonal to each other, the problem of unstable light intensity of an interference light caused by the change of the polarization state may be avoided.

In step 102, the X-polarized optical signal is phase-modulated by the first MZM to obtain an X-polarized and modulated optical signal, the obtained X-polarized and modulated optical signal is input to a $\pi/2$ phase-shift controller to obtain a phase-shifted and X-polarized optical signal, and the phase-shifted and X-polarized optical signal is input to a PBC. The Y-polarized optical signal is phase-modulated by the second MZM to obtain a Y-polarized and modulated optical signal, and the Y-polarized and modulated optical signal is input to the PBC.

The X-polarized and modulated optical signal obtained by phase-modulating the X-polarized optical signal through the first MZM may contain I information, and the Y-polarized and modulated optical signal obtained by phase-modulating the Y-polarized optical signal through the second MZM may contain Q information. The I information refers to in-phase data information, and the Q information refers to quadrature phase information.

The phase-shift controller functions to make a phase difference between the phase-shifted and X-polarized optical signal and the Y-polarized and modulated optical signal be $\pi/2$.

In step 103, the phase-shifted and X-polarized optical signal and the Y-polarized and modulated optical signal are combined by the PBC to obtain a polarization multiplexed optical signal, and the polarization multiplexed optical signal is input to a polarizer.

In step 104, the polarization multiplexed optical signal is polarized by the polarizer to obtain the stable DQPSK optical signal.

The polarizer makes an optical signal projected at a direction angle thereof pass through and filters the optical signal in other directions, so as to obtain the stable DQPSK optical signal.

Figure 4:
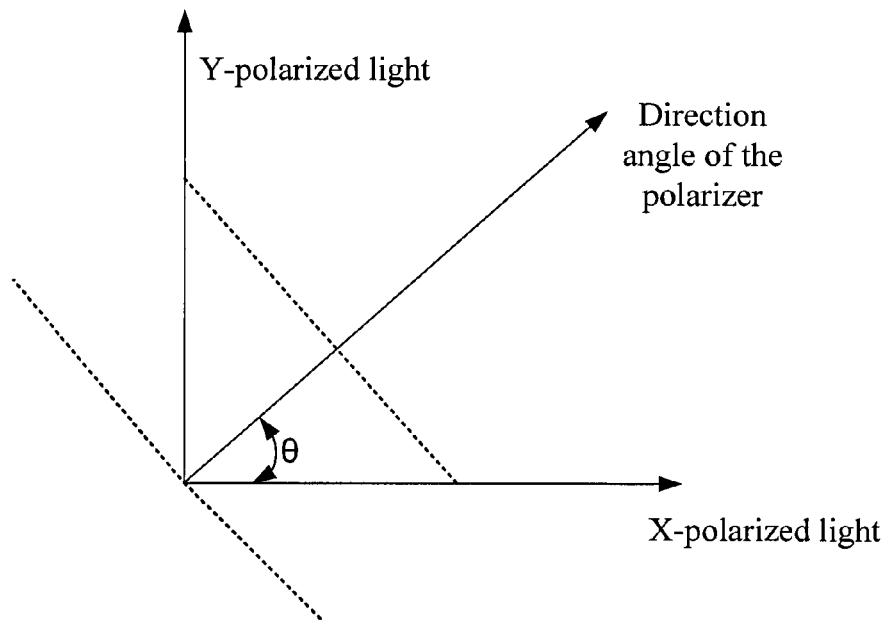
FIG. 4 is a schematic view of a direction angle of a polarizer consistent with the first embodiment.

The direction angle of the polarizer refers to an included angle between a polarizing direction of the polarizer and a polarization direction of the phase-shifted and X-polarized optical signal. As shown in FIG. 4, $\theta$ is the direction angle of the polarizer. Contributions of the phase-shifted and X-polarized optical signal and the Y-polarized and modulated optical signal to the amount of an output light intensity are made to be the same by adjusting the angle $\theta$. A light intensity of the output optical signal is $I_{out}=I_x \cos^2(\theta)+I_y \sin^2(\theta)$, where $I_x$ is a light intensity of the phase-shifted and X-polarized optical signal, $I_y$ is a light intensity of the Y-polarized and modulated optical signal, and $\theta$ is the direction angle of the polarizer. For example, when the light intensities of the phase-shifted and X-polarized optical signal and the Y-polarized and modulated optical signal are the same, the direction angle of the polarizer is preferably 45 degrees. When the light intensity of the phase-shifted and X-polarized optical signal is twice that of the Y-polarized and modulated optical signal, the direction angle $\theta$ of the polarizer may be adjusted to $\arctan(2^{1/2})$. In this way, projections of the phase-shifted and X-polarized optical signal and the Y-polarized and modulated optical signal in the direction of the direction angle of the polarizer are consistent, so as to counteract the influence of inconsistent light intensities on the output light intensity. Different light intensities may introduce some noise to the output DQPSK optical signal, which deteriorates the performance of the optical signal.

It should be noted that, step 101 may also be as follows: the Y-polarized optical signal is input to the first MZM and the X-polarized optical signal is input to the second MZM, and accordingly, step 102 may also be as follows: the Y-polarized optical signal is phase-modulated to obtain a Y-polarized and modulated optical signal, the obtained Y-polarized and modulated optical signal is input to the $\pi/2$ phase-shift controller to obtain a phase-shifted and Y-polarized optical signal, and the phase-shifted and Y-polarized optical signal is input to the PBC; the X-polarized optical signal is phase-modulated by the second MZM to obtain an X-polarized and modulated optical signal, and the X-polarized and modulated optical signal is input to the PBC.

A feedback controller may also be included in some embodiments. The feedback controller may be configured to monitor light intensity ratio information of the phase-shifted and X-polarized optical signal and the Y-polarized and modulated optical signal, calculate the direction angle $\theta$ of the polarizer through $\theta=\arctan((I_x/I_y)^{1/2})$ according to the light intensity ratio information, and send the calculated direction angle of the polarizer to the polarizer. The polarizer adjusts the direction angle according to the received information. As shown in FIG. 4, the contributions of the phase-shifted and X-polarized optical signal and the Y-polarized and modulated optical signal to the light intensity of the output optical signal may be changed by adjusting the angle $\theta$.

In some embodiments, one X-polarized optical signal and one Y-polarized optical signal can be easily obtained through the beam splitting of the PBS, so that the problem of inconsistent light intensity ratio of an X-polarized component to a Y-polarized component in the prior art may be reduced and the system performance improved. Since the X-polarized optical signal and the Y-polarized optical signal are optical signals with orthogonal polarizations, the jitter of the output light intensity due to the change of a polarization state may be avoided. The PBS, the PBC, and the polarizer can prevent the influence of external conditions such as temperature, so as to lower the requirements for the external operating environment. The influence caused by two unequal light intensities can be counteracted by adjusting the direction angle of the polarizer, so that the DQPSK optical signal can be generated stably. In addition, the feedback controller helps to control the direction angle of the polarizer.

Second Embodiment

Figure 5:
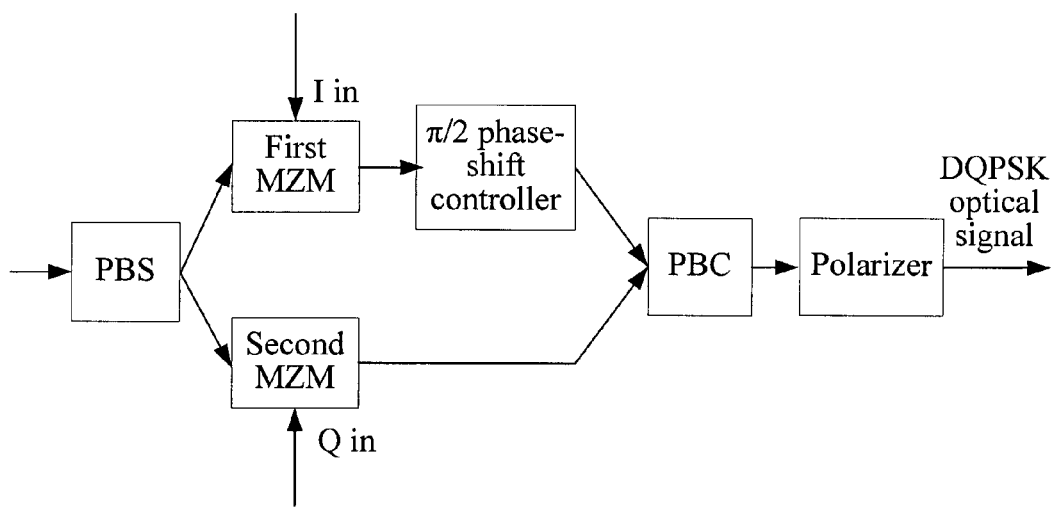
FIG. 5 is a schematic view of an apparatus for generating a DQPSK optical signal consistent with a second embodiment.

Embodiments consistent with the disclosure provide an apparatus for generating a DQPSK optical signal. Through processes of beam splitting, modulation, phase-shifting, beam combination, and polarization, the apparatus can generate the DQPSK optical signal stably, thereby helping to improve the system performance. Referring to FIG. 5, the apparatus may include a PBS, a first MZM, a π/2 phase-shift controller, a second MZM, a PBC, and a polarizer.

The PBS may be configured to split an optical signal to obtain an X-polarized optical signal and a Y-polarized optical signal, input the X-polarized optical signal to the first MZM, and input the Y-polarized optical signal to the second MZM.

It should be noted that, the Y-polarized optical signal may also be input to the first MZM and the X-polarized optical signal may also be input to the second MZM, which may achieve the same or similar effect as the process in which the X-polarized optical signal is input to the first MZM and the Y-polarized optical signal is input to the second MZM.

The first MZM may be configured to phase-modulate the X-polarized optical signal input to the first MZM to obtain an X-polarized and modulated optical signal, and input the X-polarized and modulated optical signal to the π/2 phase-shift controller.

The first MZM may also be replaced with a phase modulator or other apparatus having the similar function.

The π/2 phase-shift controller may be configured to phase-shift the X-polarized and modulated optical signal to obtain a phase-shifted and X-polarized optical signal, and input the phase-shifted and X-polarized optical signal to the PBC.

The π/2 phase-shift controller functions to make a phase difference between the phase-shifted and X-polarized optical signal and a Y-polarized and modulated optical signal be π/2.

The second MZM may be configured to phase-modulate the Y-polarized optical signal to obtain the Y-polarized and modulated optical signal, and input the Y-polarized and modulated optical signal to the PBC.

The PBC may be configured to combine the phase-shifted and X-polarized optical signal and the Y-polarized and modulated optical signal to obtain a polarization multiplexed optical signal.

The polarizer may be configured to polarize the polarization multiplexed optical signal to obtain a stable DQPSK code optical signal.

Figure 6:
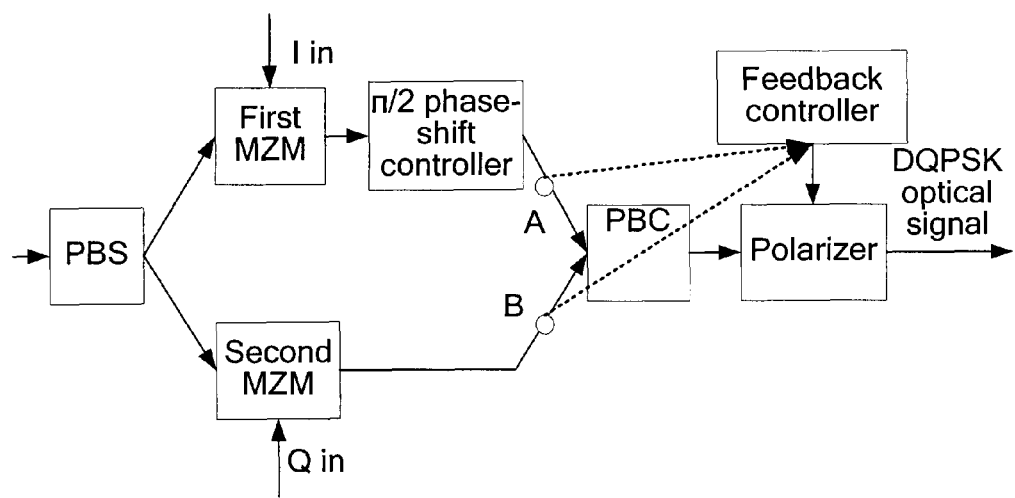
FIG. 6 is a schematic view of an apparatus for generating a DQPSK optical signal consistent with the second embodiment.

As shown in FIG. 6, the apparatus may further include a feedback controller.

The feedback controller may be configured to monitor light intensity ratio information of the phase-shifted and X-polarized optical signal and the Y-polarized and modulated optical signal, calculate a direction angle of the polarizer according to the light intensity ratio information, and send the calculated direction angle to the polarizer.

The feedback controller obtains the light intensity ratio information of the phase-shifted and X-polarized optical signal and the Y-polarized and modulated optical signal by monitoring light intensity information at two points of A and B, calculates the direction angle of the polarizer through $\theta=\arctan((I_x/I_y)^{1/2})$ according to the light intensity ratio information, and sends the calculated direction angle of the polarizer to the polarizer. The polarizer adjusts the direction angle according to the received information. In this way, the contributions of the phase-shifted and X-polarized optical signal and the Y-polarized and modulated optical signal to the output overall light intensity are consistent, which helps to generate the DQPSK code optical signal stably.

In some embodiments, one X-polarized optical signal and one Y-polarized optical signal can be obtained through the beam splitting of the PBS, so that the problem of inconsistent light intensity ratio of an X-polarized component to a Y-polarized component in the prior art may be reduced and the system performance improved. Since the X-polarized optical signal and the Y-polarized optical signal are optical signals with orthogonal polarizations, the jitter of the output light intensity due to the change of a polarization state may be avoided. The PBS, the PBC, and the polarizer may reduce the influence of external conditions such as temperature, so as to lower the requirements for the external operating environment. The influence caused by two unequal light intensities can be counteracted by adjusting the direction angle of the polarizer, so that the DQPSK optical signal can be generated stably. In addition, the feedback controller helps to control the direction angle of the polarizer.

The above descriptions are merely exemplary embodiments and are not intended to limit the disclosure. Any modification, equivalent replacement, and improvement made without departing from the spirit and principle of the embodiments shall fall within the scope of the present disclosure.

What is claimed is:

1. A method for generating a differential quadrature phase shift keying (DQPSK) code optical signal, comprising:
   splitting an optical signal to obtain two polarized optical signals;
   modulating one of the two polarized optical signals to obtain a polarized and modulated optical signal, and phase-shifting the polarized and modulated optical signal to obtain a phase-shifted and polarized optical signal;
   modulating the other of the two polarized optical signals to obtain another polarized and modulated optical signal;
   combining the phase-shifted and polarized optical signal and the another polarized and modulated optical signal to obtain a polarization multiplexed optical signal; and
   polarizing the polarization multiplexed optical signal to obtain the DQPSK code optical signal, comprising:
      acquiring light intensity ratio information of the phase-shifted and polarized optical signal and the another polarized and modulated optical signal;
      calculating a direction angle according to the light intensity ratio information; and
      polarizing the polarization multiplexed optical signal according to the direction angle to obtain the DQPSK code optical signal.

2. The method for generating a DQPSK code optical signal according to claim 1, wherein a light intensity ratio of the two polarized optical signals obtained by splitting is 1:1.

3. The method for generating a DQPSK code optical signal according to claim 1, wherein the modulation is a phase modulation.

4. An apparatus for generating a differential quadrature phase shift keying (DQPSK) code optical signal, comprising:
- a polarization beam splitter (PBS), configured to split an optical signal to obtain two polarized optical signals;
- a first modulator, configured to modulate one of the two polarized optical signals to obtain a polarized and modulated optical signal;
- a phase-shift controller, configured to phase-shift the polarized and modulated optical signal to obtain a phase-shifted and polarized optical signal;
- a second modulator, configured to modulate the other of the two polarized optical signals to obtain another polarized and modulated optical signal;
- a polarization beam combiner (PBC), configured to combine the phase-shifted and polarized optical signal and the another polarized and modulated optical signal to obtain a polarization multiplexed optical signal;
- a polarizer, configured to polarize the polarization multiplexed optical signal according to a direction angle to obtain the DQPSK code optical signal; and
- a feedback controller, configured to:
  - obtain light intensity ratio information of the phase-shifted and polarized optical signal and the another polarized and modulated optical signal,
  - calculate the direction angle of the polarizer according to the light intensity ratio information, and
  - send information of the direction angle to the polarizer.

5. The apparatus for generating a DQPSK code optical signal according to claim 4, wherein the direction angle is 45 degrees.

6. The apparatus for generating a DQPSK code optical signal according to claim 4, wherein the modulation is a phase modulation.

* * * * *